United States Patent [19]

Negi et al.

[11] Patent Number: 5,037,703

[45] Date of Patent: Aug. 6, 1991

[54] MULTILAYERED STRUCTURE

[75] Inventors: Taichi Negi; Satoshi Hirofuji, both of Kurashiki, Japan

[73] Assignee: Kuraray Co., Ltd., Kurashiki, Japan

[21] Appl. No.: 497,047

[22] Filed: Mar. 21, 1990

[30] Foreign Application Priority Data

Mar. 29, 1989 [JP] Japan ................... 1-80111

[51] Int. Cl.$^5$ ............................................. B32B 27/28
[52] U.S. Cl. ............................. 428/475.2; 428/483; 428/521; 428/522
[58] Field of Search ............. 428/483, 475.2, 522, 428/521

[56] References Cited

U.S. PATENT DOCUMENTS

| | | | |
|---|---|---|---|
| 4,261,473 | 4/1981 | Yamada et al. | 215/1 C |
| 4,398,017 | 8/1983 | Go | 528/173 |
| 4,451,599 | 5/1984 | Odorzynski et al. | 524/169 |
| 4,828,915 | 5/1989 | Schroeder et al. | 428/332 |

FOREIGN PATENT DOCUMENTS 88067 8/1978 Japan.
211033 9/1986 Japan.

*Primary Examiner*—Edith L. Buffalow
*Attorney, Agent, or Firm*—Kramer, Brufsky & Cifelli

[57] ABSTRACT

Provided are multilayered structures comprising at least 2 layers consisting of a layer of a composition (C) comprising 50 to 95 wt % of an ethylene-vinyl alcohol copolymer (A) and 50 to 5 wt % of a thermoplastic polyester (B) comprising at least 50 mol % of isophthalic acid base on the total moles of carboxylic acid component and 0.1 to 30 mol % of 1,3-bis (β-hydroxyethoxy)-benzene and/or diethylene glycol based on the total moles of diol component, and a layer of a thermoplastic resin (D), said (A) and (D) satisfying the following relationship (I):

$$110° C. \geq X_A - X_D \geq 0° C. \tag{I}$$

wherein $X_A$ represents the melting point of A and $X_D$ represents the melting point or, in the case of no melting point, the softening temperature, of D. The multilayered structure does not cause, upon heat stretching, particularly upon high-speed heat stretching, to generate pinholes, cracks, irregularities, local thickness irregularities, and have excellent gas barrier property and its reliability.

4 Claims, No Drawings

MULTILAYERED STRUCTURE

BACKGROUND OF THE INVENTION

1. Field of the invention

The present invention relates to multilayered structures comprising ethylene-vinyl alcohol copolymer (hereinafter referred to as EVOH), particularly to heat stretched multilayered structures comprising ethylene-vinyl alcohol copolymer and further to those heat stretched at a high speed, which does not, when heat stretched, form any pinholes, cracks, local thickness irregularities and the like and still has excellent gas barrier property.

2. Description of the prior art

EVOH has achieved much recognition as packaging film for foods and the like, particularly for foods requiring a barrier packaging film for oxygen, odor, flavor, etc. or for other contents requiring an odor-keeping packaging film. In these uses, EVOH is used in the form of multilayered structures comprising, besides itself, a thermoplastic resin layer(s), such as polyethylene, polypropylene, polystyrene, polyesters, polyamides and polyvinyl chloride, and a layer(s) of an adhesive resin represented by ionomers or ethylene-vinyl acetate copolymers.

Where a multilayered structure comprising EVOH and, among the above, polyester are heat stretched at a temperature lower than the melting point of EVOH, the EVOH layer is uniformly stretched without forming voids, cracks or local thickness irregularities, since polyester has a higher stretching tension than EVOH and hence the EVOH layer is influenced by the polyester layer. However, where a multilayered structure (film, sheet, parison and the like) comprising EVOH and polystyrene or the like is stretched into containers or the like at a temperature lower than the melting point of EVOH, the EVOH layer is not so affected by the polystyrene layer because of the stretching tension of polystyrene being smaller than that of EVOH, thereby forming therein a large number of microvoids, microcracks, local thickness irregularities and the like and hence greatly deteriorating the oxygen barrier property and appearance of the container formed. Such containers are therefore of no commercial value for packaging foods.

Several proposals have been made for the purpose of preventing generation of pinholes, cracks or the like in EVOH layer upon heat stretching. Namely, Japanese Patent Application Laid-open Nos. 88067/1978 and 20345/1984 disclose incorporation of various plasticizers into the EVOH layer and Japanese Patent Application Laid-open Nos. 141785/1977 and 36412/1983 disclose blending of polyamide resins with EVOH. However, the incorporation of a plasticizer is required to be in a large amount of 10 to 20 parts by weight based on 100 parts by weight of EVOH to sufficiently improve the heat stretchability, thereby raising problems of large decrease in the gas barrier property, decrease in the interlayer adhesive strength of the EVOH layer and the like, and is thus unapplicable in practice.

The blending of a polyamide resin is not applicable either for practical purpose, becasue the shaped articles obtained from such blend contain a large number of gels and/or suffer from serious coloring, due to, presumably, large chemical reactivity of the polyamide with EVOH. Even when a polyamide not causing formation of large number of gels or coloring is used, the obtained containers, which have apparently good appearance, show a large variability of gas barrier property values and are thus not reliable as a gas barrier container, due to, presumably, generation of minute pinholes at, particularly, high-speed heat stretching.

Accordingly, there has been desired development of an EVOH which gives highly reliable high gas-barrier containers, in other words, which does not, when the layer comprising it is heat stretched at a high speed, form minute pinholes, cracks, thickness irregularities and the like.

With respect to the specific polyester used in the present invention, Japanese Patent Application Laid-open No. 167617/1983 discloses the very polyester but does not describe at all about a composition of its blend with EVOH or a technical thought that the composition is improved in high-speed heat stretchability and in reliability in the gas barrier property. Further Japanese Patent Application Laid-open No. 211033/1986 discloses incorporating the specific polyester used in the present invention in EVOH and laminating the thus obtained composition directly on a polyester layer and that by doing so a firm interlayer adhesion is achieved. However, the patent application does not describe or anticipate that such incorporation and lamination produces improvement effect in stretchability and thermoformability, or about resulting improvement in the reliability of gas barrier property, of the obtainable multilayered structure, which is the very object of the present invention. Since such multilayered structure of polyester with EVOH as is described in the above patent application can generally be readily stretched at a low temperature of 80° to 120° C. and thermoformed at this temperature range, it is not necessary to modify EVOH to further improve the stretchability and thermoformability.

It thus was quite unexpectedly found that the EVOH composition of the above patent application improves the stretchability and thermoformability, and further the reliability of gas barrier property, of multilayered structures comprising the composition layer together with a layer of polystyrene, polypropylene or the like.

SUMMARY OF THE INVENTION

Accordingly, an object of the present invention is to provide a multilayered structure comprising an EVOH composition layer, which has highly reliable high gas barrier property inherent to EVOH and does not, when being processed into containers or the like, cause generation of cracks, pinholes, local thickness irregularities and the like in the EVOH composition layer.

The above object can be achieved by a multilayered structure comprising a layer of a composition (C) comprising 50 to 95 wt % of EVOH (A) and 50 to 5 wt % of a thermoplastic polyester (B) comprising at least 50 mol % of isophthalic acid based on the total moles of carboxylic acid component and 0.1 to 30 mol % of 1,3-bis($\beta$-hydroxyethoxy)benzene and/or diethylene glycol based on the total moles of diol component, said thermoplastic polyester (B) more specifically having a dynamic viscoelasticity, E', at 120° C. of not more than $10^9$ dyne/cm$^2$, and a layer of a thermoplastic resin (D) satisfying the following relationship (I):

$$110° C. \geq X_A - X_D \geq 0° C. \tag{I}$$

wherein $X_A$ represents the melting point of A and $X_D$ represents the melting point or, in the case of no melting point, the softening temperature, of D.

The melting point herein means a temperature at which an endothermic peak (maximum endothermic peak in the case of two or more peaks) appears by differential scanning calorimetry using a Mettler DSC apparatus and the specimen is heated under an atmosphere of nitrogen at a temperature-raising rate of 10° C./min.

The softening temperature is employed when a specimen does not show an melting peak by DSC and measured herein with an instrument (HDT tester, available from Toyo Seiki Co.) with the specimen kept under a load of 1 kg.

DETAILED DESCRIPTION OF THE PREFERRED EMBODIMENTS

The present inventors prepared various multilayered sheets comprising a layer of compositions obtained by blending various plasticizers, polymers or the like with EVOH and a layer of a thermoplastic resin with an adhesive layer interposed between the two layers, then prepared cups and bottles by heating and stretching the sheets, and evaluated the thus obtained containers for appearance and gas barrier property. As a result, it has been found that heat stretching of a laminate comprising a layer of the above-described composition (C) and a layer of a thermoplastic resin (D) satisfying the above-described relationship (I) gives shaped articles with neat appearance and having no cracks, pinholes, local thickness irregularities in the EVOH composition layer.

In particular, it has also been found that the multilayered sheet comprising a layer of the EVOH composition (C) and, as a layer of a thermoplastic resin (D), one of polystyrene or like resin which should be heat stretched at a low temperature, often produces, when stretched at a low temperature (110°-140° C.) or high-speed stretched at higher temperatures, a significant variability in the gas barrier property values of the obtained article, perhaps because of formation of minute cracks and pinholes in the EVOH composition layer. The present inventors therefore further studied intensively to solve this problem and found, unexpectedly, that the problem is minimized by the use of the above-mentioned thermoplastic polyester resin (B) especially having a dynamic viscoelesticity, E, at 120° C. of not more than $10^9$ dyne/cm$^2$ as the thermoplastic resin to be blended with EVOH (A). The multilayered sheet comprising such polyester resin has good formability and suffers almost no deterioration in gas barrier properties upon stretching, thus giving a highly reliable high gas barrier container with very small variability in the gas barrier property values.

The EVOH (A) used in the present invention is a saponified product of an ethylene-vinyl acetate copolymer, having an ethylene content of 20 to 60 mol %, preferably 25 to 50 mol % and a saponification degree of vinyl acetate component of at least 90%, preferably at least 95%. The melt formability is poor with the ethylene content not reaching 20 mol %, while the gas barrier property becomes insufficient with the ethylene content exceeding 60 mol %. If the saponification degree is not more than 90%, the gas barrier property and thermal stability will be low. The EVOH may comprise by copolymerization, within the limits not to impair the object of the present invention, other comonomers, e.g., propylene, butylene, unsaturated carboxylic acids or esters thereof such as (meth)acrylic acid, (meth)acrylic acid esters (methyl, ethyl and the like), etc., vinylsilanes such as vinyltrimethoxysilane and vinyltriethoxysilane, vinylpyrrolidones such as N-vinylpyrrolidone, and the like. The EVOH may further comprise a plasticizer, thermal stabilizer, ultraviolet absorber, antioxidant, color, filler, other resins, e.g. polyamides, partially saponified ethylene-vinyl acetate copolymer, etc. and the like. The EVOH used in the present invention preferably has a melt index, MI, (measured at 190° C., under a load of 2160 g) of 0.1 to 50 g/10 min, more preferably 0.5 to 20 g/10 min.

The thermoplastic polyester (B) used in the present invention is a polyester comprising as dicarboxylic acid component at least 50 mol % of isophthalic acid based on the total moles of dicarboxylic acid component. Other dicarboxylic acids which can be used together with iophthalic acid are, for example, aromatic dicarboxylic acids such as terephthalic acid, orthophthalic acid, naphthalenedicarboxylic acid, diphenyl ether dicarboxylic acid and diphenyl-4,4-dicarboxylic acid; aliphatic dicarboxylic acids such as oxalic acid, malonic acid, succinic acid, glutaric acid, adipic acid, pimeric acid, suberic acid, azelaic acid and sebacic acid; and alicyclic acids such as cyclohexane-dicarboxylic acid. These dicarboxylic acid can be used singly or in combination, in an amount of less than 50 mol %. Among these, terephthalic acid, naphthalenedicarboxylic acid and diphenyl ether dicarboxylic acid are preferred from the viewpoint of thermoformability, gas barrier property and the like.

The thermoplastic polyester (B) used in the present invention further must comprise as the diol component 0.1 to 30 mol % of 1,3-($\beta$-hydroxyethoxy)benzene and/or diethylene glycol based on the total moles of diol component. Other diol components which can be used together with 1,3-($\beta$-hydroxyethoxy)benzene and/or diethylene glycol are, for example, aliphatic glycols such as ethylene glycol, 1,3-propanediol, 1,4-butanediol, 1,5-pentanediol, 1,6-hexanediol, 1,9-nonanediol and triethylene glycol; and alicyclic glycols such as cyclohexanediol and cyclohexanedimethanol. These glycols may be used singly or in combination. Among these, ethylene glycol and cyclohexanediol are preferred from the viewpoint of thermoformability, impact strength and the like.

The thermoplastic polyester must, as afore-described, comprise as dicarboxylic acid component at least 50 mol %, preferably in the range of 50 to 95 mol %, of isophthalic acid. If the content of isophthalic acid component is less than 50 mol %, the polyester will not produce sufficient improvement effect in thermoformability and further the obtained multilayered structure will be of poor gas barrier property. The diol component of 1,3-($\beta$-hydroxyethoxy)benzene and/or diethylene glycol must be contained, singly or in combination, in an amount of 0.1 to 30 mol %, preferably 0.5 to 25 mol %. The content exceeding 30 mol % cannot produce sufficient effect of improving thermoformability, while the content less than 0.1 mol % leads to unreliable gas barrier property of the obtained multilayered structure, perhaps because of poor compatibility of the polyester with EVOH.

The preferred condition in the present invention is that the thermoplastic polyester resin (B) have a viscolasticity, E', at 120° C. of not more than $10^9$ dyne/cm$^2$, most preferably not more than $5 \times 10^8$ dyne/cm$^2$. If E' exceeds $10^9$ dyne/cm$^2$, minute cracks and unevenness will tend to generate in the EVOH composition layer when the multilayered structure is high-speed heat stretched, particularly at a relatively low temperature (110° to 140° C.), thereby lowering the reliability for the gas barrier property of the multilayered shaped article after being stretched. For the preparation of the thermoplastic polyester (B) having an E' of not more than $10^9$ dyne/cm$^2$, important is the content ratio of 1,3-($\beta$-hydroxyethoxy)benzene and/or diethylene glycol, more particularly the ratio of 1,3-($\beta$-hydroxyethoxy)benzene to diethylene glycol, both being contained. While higher content of isophthalic acid is preferred with respect to gas barrier property of multilayered structure, too high a content of isophthalic acid makes E' of the polyester higher than $10^9$ dyne/cm$^2$, which often causes to decrease the thermoformability of the multilayered structure and the reliability of gas barrier property of the formed articles. The use of 1,3-($\beta$-hydroxyethoxy)benzene and/or diethylene glycol as diol component, preferably the use of both, in a 1,3-($\beta$-hydroxyethoxy)benzene/diethylene glycol ratio (mole ratio) of 1/99 to 80/20, more preferably 2/98 to 50/50, gives a polyester which has high isophthalic acid content and at the same time has an E' of not more than $10^9$ dyne/cm$^2$. The polyester can then, in combination with EVOH, give the multilayered structure that does not decrease the reliability of its gas barrier property when high-speed heat stretched, perhaps because no pinholes, minute cracks or thickness irregularities occur by the stretching.

The dynamic viscoelasticity, E', herein is measured on a single layer specimen having a thickness of 20 to 500$\mu$ with RHEOVIBRON (Model DDV-II EP, made by Orientec Co.) at a frequency of 110 Hz and 120° C.

The molecular weight of the thermoplastic polyester (B) greatly influences its sheet formability and the physical properties of the obtained containers, and its intrinsic viscosity, a measure of the molecular weight, is preferably at least 0.60 dl/g, more preferably at least 0.70 dl/g. The intrinsic viscosity herein is measured in a mixed solvent of phenol/tetrachloroethane (1/1 by weight) at 30° C.

The thermoplastic polyester (B) may contain, within limits not to impair the function and effect of the present invention, a thermal stabilizer, plasticizer, color, ultraviolet absorber, antistatic agent and the like.

The thermoplastic polyester (B) is added to EVOH (A) in an amount of 5 to 50 wt % based on the total weight of (A) and (B), preferably 7 to 35 wt % on the same basis. If the addition does not reach 5 wt %, the formability improvement effect of the polyester will not fully be produced, resulting in ready formation of cracks and thickness irregularities. On the other hand, if the addition exceeds 50 wt %, the gas barrier property will decrease to a large extent and the obtainable containers will not be usable as high gas barrier property.

There are no particular limits with respect to process for blending EVOH (A) and the thermoplastic polyester (B), and there can be used a process which comprises dry blending (A) and (B) and using the blend as it is; a process, which is more preferred, which comprises blending the two with Banbary mixer and pelletizing the blend with a single- or twin-screw extruder, etc.; and the like. If the two are not uniformly blended or if gels generate or foreign matters mix into, there will likely occur breakage of the EVOH composition layer or generation of cracks and irregularities in the layer upon heat-stretch formation. It is therefore preferred to use, when blending and pelletizing, an extruder having a high kneading ability and to extrude through such extruder at a low temperature with its hopper inlet nitrogensealed. At the time of the blending and pelletizing, additives such as plasticizer, thermal stabilizer, ultraviolet absorber, antioxidant, color, filler and other resins may be added within the limits not to impair the object of the present invention. In particular, for the purpose of preventing gel generation, it is preferred to add 0.01 to 1 wt % of at least one member selected from hydrotalcites, hindered phenol or hindered amine thermal stabilizers, and metal salts of higher aliphatic carboxylic acids.

Described next is preparation of the multilayered structure of the present invention by laminating the layer of the composition (C) comprising (A) and (B) thus obtained with a layer of a thermoplastic resin (D). It is important that the thermoplastic resin (D) to be laminated on at least one surface of the layer of the composition (C) be a resin satisfying the afore-mentioned relationship (I), more preferably one satisfying the following relationship (I').

$$110° C. \geq X_A - X_D \geq 10° C. \qquad (I')$$

If ($X_A - X_D$) exceeds 110° C., the glass transition temperature, Tg, of the thermoplastic resin (D) will generally be below room temperature, thereby rendering the shaped articles obtained by heat stretching poor in dimensional stability and thus unusable. On the other hand, if ($X_A - X_D$) is lower than 0° C., the EVOH will generally soften and melt upon heat stretching, thereby rendering the heat stretching formation possible without demanding the particular use of the composition (C) of the present invention. Further in the case where, as described before, polyester resin is laminated with EVOH, the laminate can be heat stretched even at a temperature below the melting point of EVOH, thereby also eliminating necessity for the particular use of the composition (C) used in the present invention.

Preferred examples of the thermoplastic resin (D) are polyolefin resins, e.g. polyethylene, polypropylene, ethylene-vinyl acetate copolymer, ethylene-(meth)acrylic acid ester (methyl or ethyl ester) copolymers, etc.; polystyrene resins, e.g. polystyrene, styrene-butadiene copolymer, styrene-butadiene-acrylonitrile copolymer, shock-resistant polystyrene resin, etc.; polyamide resins; polyvinyl chloride resin; polymethacrylate resins; and the like. Among the above, polyolefin resins, particularly polypropylene, and polystyrene resins are more preferable.

These thermoplastic resins may be used singly or in combination of 2 or more. Further in the present invention these thermoplastic resins may be used in combination with a small amount, for example not more than 50% by weight, preferably not more than 40% by weight and most preferably not more than 30% by weight, of other thermoplastic resins which do not satisfy the relationship (I). Scraps of the multilayered structure (film, sheet, parison, container, etc.) of the present invention are suitable example of such other thermoplastic resins to be used in combination.

In the present invention, any adhesive resin can be used for laminating a layer of the composition (C) with a layer of the thermoplastic resin (D), insofar as it firmly bonds the two layer, and preferred examples are polyolefins, e.g. polyethylene such as low density polyethylene (LDPE), linear low density polyethylene (LLDPE) and super low density polyethylene (SLDPE), ethylene-vinyl acetate copolymers and ethylene-(meth)acrylic acid ester (methyl or ethyl ester) copolymers, which are grafted with an unsaturated carboxylic acid or its anhydride, such as maleic anhydride.

The multilayered structure of the present invention is prepared from the composition (C) and the thermoplastic resin (D) with, in most cases, an adhesive resin between the two by the following processes:

The multilayered structure (film, sheet or parison) is prepared by extrusion lamination, dry lamination, coextrusion lamination, coextrusion sheet formation, coextrusion pipe formation, coinjection, solution coating or the like. Then, the laminate is, at a temperature satisfying the following formula, formed into shaped articles by uniaxially or biaxially stretching, vaccum pressure deep drawing, biaxially stretching blowing or like processes.

$$X_A - 10° C. \geq Y \geq X_A - 110° C. \qquad (II)$$

wherein Y is the heat stretching temperature (°C.).

The thickness construction of the multilayered structure is not specifically restricted, but it is preferred in consideration of formability, cost and the like that the ratio of the thickness of the composition (C) layer to the total thickness be in the range of from 2 to about 20%. Representative examples of the construction are: composition (C) layer/adhesive resin layer/thermoplastic resin (D) layer and thermoplastic resin (D) layer/adhesive resin layer/composition (C) layer/adhesive resin layer/thermoplastic resin (D) layer. Constructions comprising the thermoplastic resin (D) layers for both outermost layers are most desirable, with the thermoplastic resin being the same or different. The specific feature of the present invention lies in that, in co-extruded multilayered sheets, the thickness distribution of the composition (C) layer is uniform not only along the MD direction (direction of extrusion) but also across the TD direction (direction perpendicular to the extrusion direction). Accordingly, in the multilayered structures of the present invention, not only the variability, R, of gas barrier property values along the MD direction is small, but also that across the TD direction is small.

In the present invention, the multilayered structure obtained by heat stretching means, as stated before, a container such as cup, bottle, sheet or film obtained by heating and stretching. The heating herein means an operation which makes the multilayered structure thermally nearly uniform, and for this purpose operations of heating uniformly with various heaters are preferred in consideration of operatability.

The heating operation can be conducted either at the same time with or before stretching. The stretching herein means an operation of forming a thermally uniformly heated multilayered structure uniformly into a container such as cup, bottle, sheet or film by the use of a chuck, plug, or by vacuum, pressure or like forces. Here either uniaxial stretching or biaxial stretching can be employed depending on the intended use of the obtained article. The stretching ratio and speed are appropriately selected depending on the purpose, but, in the present invention, a uniform stretching at a high speed of at least $5 \times 10^5 \%$/min is particularly suited. While it is often preferred that all the layers of the multilayered structure thus stretched be oriented, it is in some cases not necessary that all the layers be oriented.

In the present invention, the moisture content of EVOH is not specifically limited but, it is preferably in the range of 0.001 to 10 wt %. In general, in processes for preparing a composition of EVOH and the thermoplastic polyester and those of forming the composition into a multilayered structure, the moisture content of EVOH is preferably as low as possible, i.e. within the range from 0.001 to 1 wt %. On the other hand, in processes of thermoformation of the obtained multilayered structure, the moisture content of EVOH composition layer is preferably at a higher level, i.e. 0.01 to 10 wt %, within the limit not to cause evaporation in the EVOH composition layer.

The multilayered containers, particularly heat stretched multilayered containers thus obtained of the present invention are used as very effective food packaging containers, containers requiring high flavor keeping property and the like, since their composition (C) layer has no pinholes, cracks or thickness irregularities and hence they have high gas barrier properties with minimal variability.

Other features of the invention will become apparent in the course of the following descriptions of exemplary embodiments which are given for illustration of the invention and are not intended to be limiting thereof.

EXAMPLES

EXAMPLE 1

Pellets were prepared by extruding at 200° C. and under an atmosphere of nitrogen 80 parts of an EVOH (EVAL ® made by Kuraray) having an ethylene content of 31 mol %, a saponification degree of 99.4%, an melt index (MI) (190° C., 2160 g) of 1.3 g/10 min and a melting point of 181° C., and 20 parts of a thermoplastic polyester containing 90 mol % of isopthalic acid and 10 mol % of terephthalic acid, based on the total moles of dicarboxylic acid component, and 10 mol % of 1,3-bis(β-hydroxy-ethoxy)benzene (hereinafter referred to as BHB), 15 mol % of diethylene glycol (hereinafter referred to as DEG) and 75 mol % of ethylene glycol, base on the total moles of diol component, through an 40-φ twinscrew, bent-type extruder, followed by pelletization of the extruded melts. The thermoplastic polyester had a dynamic viscoelasticity, E', at 120° C. of $4 \times 10^8$ dyne/cm$^2$ and a melt index, MI, at 190° C., 2160 g of 30 g/10 min.

The thus obtained pellets were formed into a multilayered sheet through a 3 kind/5 layer coextrusion extruder. The sheet had a construction of both outermost layers of polystyrene (thickness: 800μ), two adhesive layers (50μ) and an intermediate layer (50μ) of the EVOH composition obtained above. The polystyrene used was IDEMITSU STYROL ET-61 (softening point: 89° C.) made by Idemitsu Petrochemical Co. The adhesive resin used was an ethylene-vinyl acetate copolymer modified with maleic anhydride (MERCENE M-5420, made by Toso Co.). The sheet was then formed into cups through a vacuum pressure thermoformer at 140° C. and at a stretching speed of $9 \times 10^5$ %/min.

The cups thus obtained had no craks, irregularities or thickness irregularities and had a good appearance. The cups were conditioned at 20° C., 65% RH and 20 of them were tested for gas barrier property with Model 10/50 made by Mocon Co. to give a very high average gas barrier property of 0.5 cc.20μ/m$^2$.24 hr.atm, as well as a very small variability of individual values, R = maximum − minimum, of 0.1 cc.20μ/m$^2$.24 hr.atm, thus proving to be highly reliable high gas barrier containers.

EXAMPLES 2 THROUGH 5 AND COMPARATIVE EXAMPLES 1 THROUGH 7

Example 1 was repeated except for using conditions shown in Table 1. The results are shown in Table 1.

Obviously, numerous modifications and variations of the present invention are possible in light of the above teachings. It is therefore to be understood that within the scope of the appended claims, the invention may be practiced otherwise than as specifically described herein.

What is claimed is:

1. A multilayered structure comprising at least 2 layers consisting of a layer of a composition (C) comprising 50 to 95 wt % of an ethylene-vinyl alcohol copolymer (A) having an ethylene content of 20 to 60 mol % and 50 to 5 wt % of a thermoplastic polyester (B) comprising at least 50 mol % of isophthalic acid based on the total moles of carboxylic acid component and 0.1 to 30 mol % of 1,3-bis($\beta$-hydroxyethoxy)-benzene and/or diethylene glycol based on the total moles of diol com-

TABLE 1

| | Raw materials for EVOH composition | | | | | | | |
|---|---|---|---|---|---|---|---|---|
| | EVOH (A) | | | Thermoplastic polyester (B) | | | | Ratio (B)/((A)+(B)) wt % |
| | Ethylene mol % | MI g/10 min | M.P. (°C.) | Isophthalic acid mol % *1 | DEG (mol %) *2 | BHB | Dynamic viscoelasticity, E' at −120° C. dyne/cm² | MI g/10 min | |
| Ex. | | | | | | | | | |
| 1 | 32 | 1.5 | 181 | 90 | 15 | 10 | 4 × 10⁸ | 30 | 20 |
| 2 | 45 | 5.5 | 165 | 90 | 15 | 10 | 4 × 10⁸ | 30 | 20 |
| 3 | 32 | 1.5 | 181 | 95 | 25 | 0 | 6 × 10⁸ | 20 | 20 |
| 4 | 32 | 1.5 | 181 | 90 | 15 | 10 | 4 × 10⁸ | 30 | 20 |
| 5 | 32 | 1.5 | 181 | 90 | 0 | 10 | 8 × 10⁸ | 30 | 20 |
| Comp. Ex. | | | | | | | | | |
| 1 | 132 | 1.5 | 181 | 0 | 0 | 0 | — | — | 0 |
| 2 | 32 | 1.5 | 181 | 30 | 15 | 10 | 7 × 10⁸ | —*3 | 20 |
| 3 | 32 | 1.5 | 181 | 90 | 50 | 0 | 4 × 10⁸ | 25 | 20 |
| 4 | 32 | 1.5 | 181 | 55 | 35 | 0 | 2 × 10⁸ | 15 | 20 |
| 5 | 32 | 1.5 | 181 | 0 | 0 | 0 | 8 × 10⁹ | 30 | 20 |
| 6 | 32 | 1.5 | 181 | 90 | 0 | 0 | 2 × 10⁹ | 40 | 20 |
| 7 | 32 | 1.5 | 181 | 50 | BG 50 | 0 | 7 × 10⁸ | 60 | 20 |

| | Multilayered sheet | | | | | Characteristics of thermoformed container | | | |
|---|---|---|---|---|---|---|---|---|---|
| | | | | | | | Gas barrier property | | |
| | | | | | | | MD direction of sheet | | TD direction of sheet | |
| | Outermost layer 425μ | Adhesive layer 50μ | EVOH layer 50μ | Adhesive layer 50μ | Innermost layer 425μ | Appearance | Average cc · 20μ/ m² · day · atm | R = max. − min. cc · 20μ/ m² · day · atm | Average cc · 20μ/ m² · day · atm | R = max. − min. cc · 20μ/ m² · day · atm |
| Ex. | | | | | | | | | | |
| 1 | PS | Ad1 | composition | Ad1 | PS | good | 0.5 | 0.1 | 0.6 | 0.4 |
| 2 | PS | Ad1 | composition | Ad1 | PS | good | 2.5 | 0.2 | 2.8 | 0.6 |
| 3 | PS | Ad1 | composition | Ad1 | PS | good | 0.6 | 0.2 | 0.8 | 1.0 |
| 4 | PP | Ad2 | composition | Ad2 | PP | good | 0.5 | 0.1 | 0.6 | 0.3 |
| 5 | PS | Ad1 | composition | Ad1 | PS | good | 0.7 | 0.4 | 1.0 | 1.5 |
| Comp. Ex. | | | | | | | | | | |
| 1 | PS | Ad1 | EVOH | Ad1 | PS | cracks | 12 | 35 | 22 | 66 |
| 2 | PS | Ad1 | composition | Ad1 | PS | cracks | 34 | 66 | 38 | 79 |
| 3 | PS | Ad1 | composition | Ad1 | PS | good | 4.8 | 12 | 8.4 | 21 |
| 4 | PS | Ad1 | composition | Ad1 | PS | good | 6.9 | 22 | 9.9 | 50 |
| 5 | PS | Ad1 | composition | Ad1 | PS | cracks | 26 | 23 | 36 | 33 |
| 6 | PS | Ad1 | composition | Ad1 | PS | good | 3.6 | 9.8 | 4.8 | 15 |
| 7 | PS | Ad1 | composition | Ad1 | PS | good | 4.6 | 4.8 | 7.0 | 14 |

*1 The rest of dicarboxylic acid component is terephthalic acid.
*2 The rest of diol component is ethylene glycol.
*3 Could not be measured.
DEG: Diethylene glycol
BHG: 1,3-bis($\beta$hydroxyethoxy)benzene
BG: Butylene glycol
PS: Polystyrene (IDEMITSU STYROL ET-61, sp.: 89° C. available from Idemitsu Petrochemical Co., Ltd.)
PP: Random-polypropylene (NOBLEN EX-6, m.p.: 149° C. available from Mitsubishi Petrochemical Co., Ltd.)
Ad1: Ethylene-vinyl acetate copolymer modified with maleic anhydride (MERCENE M-5420, available from Toyo Soda Manufacturing Co., Ltd.)
Ad2: Polypropylene modified with maleic anhydride (ADMER QF-500, available from Idemutsu Petrochemical Co., Ltd.)

ponent, and a layer of a thermoplastic resin (D), said (A) and (D) satisfying the following relationship (I):

$$110°\ C. \geq X_A - X_D \geq 0°\ C. \tag{I}$$

wherein $X_A$ represents the melting point of A nd $X_D$ represents the melting point or, in the case of no melting point, the softening temperature, of D, wherein said thermoplastic resin is selected from the group consisting of polyolefin resins, polystyrene resins, polyamide resins, polyvinyl chloride resins, polymethacrylate resins and combinations thereof.

2. A multilayered structure according to Claim 1, wherein said thermoplastic polyester resin (B) has a dynamic viscoelasticity, E', at 120° C. of not more than $10^9$ dyne-cm$^2$.

3. A multilayered structure according to Claim 1, wherein said ethylene-vinyl alcohol copolymer (A) and said thermoplastic resin (D) satisfy the following relationship (I'):

$$110°\ C. \geq X_A - X_D \geq 10°\ C. \tag{I'}$$

4. A multilayered structure according to Claim 1, wherein said composition (C) layer and said thermoplastic resin (D) layer are laminated via a polyolefin resin modified with an unsaturated carboxylic acid or its anhydride.

* * * * *